(12) United States Patent
Schedivy

(10) Patent No.: US 7,933,121 B2
(45) Date of Patent: Apr. 26, 2011

(54) PORTABLE VIDEO SYSTEM INCLUDING A BAG FOR HOUSING A VIDEO PLAYER

(75) Inventor: George C. Schedivy, Aquebogue, NY (US)

(73) Assignee: Audiovox Corporation, Hauppauge, NY (US)

(*) Notice: Subject to any disclaimer, the term of this patent is extended or adjusted under 35 U.S.C. 154(b) by 236 days.

(21) Appl. No.: 12/248,985

(22) Filed: Oct. 10, 2008

(65) Prior Publication Data
US 2009/0052874 A1    Feb. 26, 2009

Related U.S. Application Data

(60) Division of application No. 11/235,404, filed on Sep. 26, 2005, now Pat. No. 7,440,275, which is a continuation of application No. 10/423,732, filed on Apr. 25, 2003, now Pat. No. 6,961,239.

(51) Int. Cl.
| H05K 5/00 | (2006.01) |
| G03B 21/00 | (2006.01) |
| H04N 7/18 | (2006.01) |
| H04N 5/64 | (2006.01) |
| B65D 85/00 | (2006.01) |
| B60R 11/06 | (2006.01) |

(52) U.S. Cl. ............ 361/679.55; 353/13; 710/303; 725/75; 206/320; 206/576; 348/837; 296/37.8; 296/37.15; 296/37.16; 150/165; 224/275

(58) Field of Classification Search ............ 361/679.27, 361/679.29, 679.55; 353/13; 710/303–304; 725/75; 206/320; 348/837; 296/37.8
See application file for complete search history.

(56) References Cited

U.S. PATENT DOCUMENTS

| 6,092,705 | A   | * | 7/2000  | Meritt ........................ 224/275 |
| 6,097,448 | A   | * | 8/2000  | Perkins ...................... 348/837 |
| 6,216,927 | B1  | * | 4/2001  | Meritt ........................ 224/275 |
| 6,685,016 | B2  | * | 2/2004  | Swaim et al. ............... 206/320 |
| 6,928,654 | B2  | * | 8/2005  | Tranchina et al. ............ 725/75 |
| 6,975,806 | B1  | * | 12/2005 | Lavelle et al. ............... 386/46 |
| 2002/0105507 | A1 | * | 8/2002  | Tranchina et al. .......... 345/204 |
| 2005/0098594 | A1 | * | 5/2005  | Truong ....................... 224/275 |
| 2005/0268318 | A1 | * | 12/2005 | Krieger et al. ............... 725/75 |

* cited by examiner

*Primary Examiner* — Zachary M Pape
(74) *Attorney, Agent, or Firm* — F. Chau & Associates, LLC

(57) ABSTRACT

A portable video system comprises a video unit for facilitating play of a video medium, the player having a hinge, a display pivotally attached to the video player on the hinge, and a base unit secured to a substrate for selectively coupling a control panel of the video unit to the substrate, wherein the control panel can be selectively un-coupled from the base unit.

8 Claims, 12 Drawing Sheets

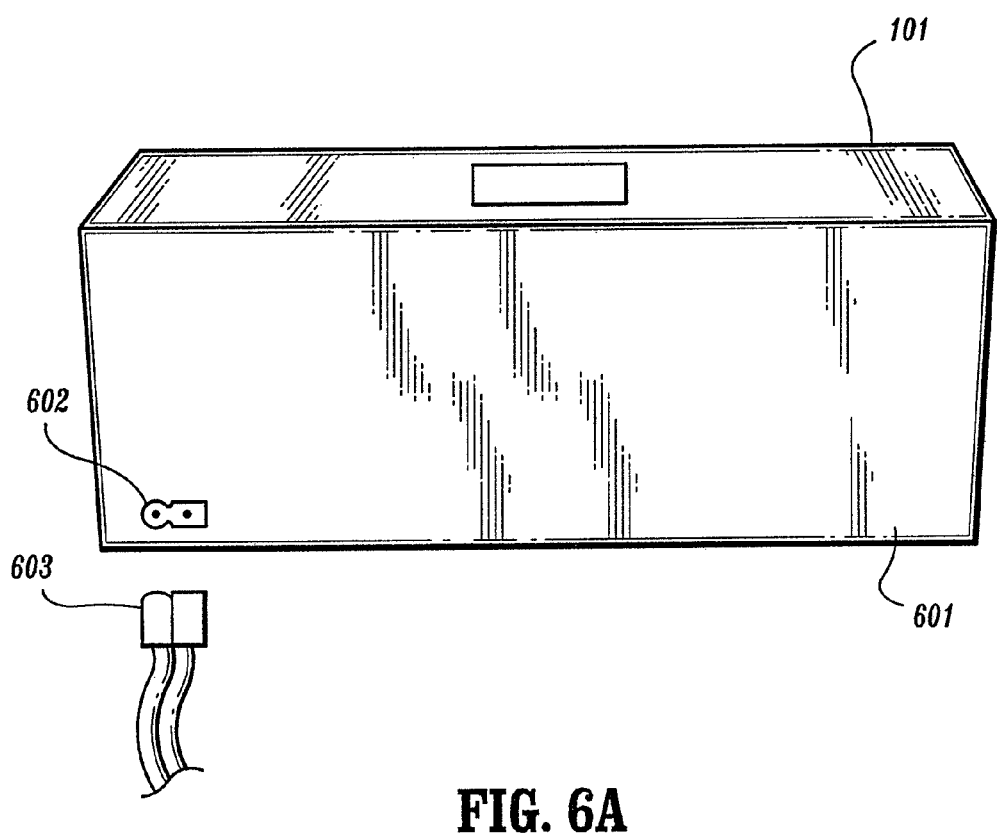
FIG. 6A
FIG. 6B     FIG. 6C ns
PORTABLE VIDEO SYSTEM INCLUDING A BAG FOR HOUSING A VIDEO PLAYER

CROSS-REFERENCE TO RELATED APPLICATIONS

This application is a Divisional of U.S. application Ser. No. 11/235,404 filed on Sep. 26, 2005 now U.S. Pat. No. 7,440,275, which is a Continuation of U.S. application Ser. No. 10/423,732, filed on Apr. 25, 2003, now U.S. Pat. No. 6,961,239, the entireties of which are incorporated by reference herein.

BACKGROUND OF THE INVENTION

1. Field of the Invention

The present invention relates to a video system, and more particularly to a portable video system.

2. Discussion of Related Art

As society becomes more mobile and therefore spends a greater amount of time traveling and away from home, demand rises for electronic appliances and devices outside the home environment. For example, recently, consoles having video cassette players and screens have been mounted on in vehicles, facilitating video entertainment on the road. However, the video player or screen cannot be removed from the console or interior of a vehicle. Thus, videos may only be viewed with such systems when occupying the vehicle. Further, there is also a risk of theft of the video system and corresponding damage to the vehicle when the vehicle is unattended.

While portable or small TVs with video cassette players can be used in various environments, it is difficult to secure such devices. When not secured, such devices can become a hazard, for example, inside a moving vehicle or in a busy work environment.

Therefore, a need exists for a video system adaptable to various environments.

SUMMARY OF THE INVENTION

According to an embodiment of the present invention, a portable video system comprises a video unit for facilitating play of a video medium, the player having a hinge, a display pivotally attached to the video player on the hinge, and a base unit secured to a substrate for selectively coupling a control panel of the video unit to the substrate, wherein the control panel can be selectively uncoupled from the base unit.

The hinge is disposed between the display and the control panel and the display is pivotable from a stowed position wherein the display lies in a plane parallel to a plane of the control panel, to variable positions about an axis defined by the hinge.

The system further comprises a receiver for receiving control signals from a remote control device.

The video medium is a digital videodisk.

The base unit comprises an adapter for receiving an AC or a DC power source, the base unit providing power to a coupled video unit.

The display is an LCD type monitor.

The base unit comprises a jack for connecting an external device to a secured video unit, wherein a signal is carried between the secured video unit and the external device.

The substrate is a bag for housing the video player and the display, the bag having a flap cover for opening and closing a portion of the bag, and fastening means for suspending the bag, wherein the flap cover is opened for accessing the video player and the display. The bag is suspended from a seat of the vehicle.

The base unit comprises a means for securing the control panel.

Each of the base unit and the video unit comprises a pin array, wherein the respective pin arrays connect the base unit to the video unit.

The video unit is one of a clamshell-type video unit, a drawer-type video unit, and a slot-type video unit.

According to an embodiment of the present invention, a base unit of a portable video system comprises a means for securing the base unit to a substrate, a means for securing a removable video unit to the base unit, and a pin array for providing power to a secured removable video unit.

The pin array carries a signal between the secured removable video unit and an external device.

The signal is one of an audio signal and a video signal.

The base unit comprises a light source.

A cover is secured to the base unit in the absence of the removable video unit. The cover comprises a connection to the means for providing power and a light source.

BRIEF DESCRIPTION OF THE DRAWINGS

Preferred embodiments of the present invention will be described below in more detail, with reference to the accompanying drawings:

FIG. 6A is an illustration of a base unit according to an embodiment of the present invention;

FIGS. 6B and 6C are illustrations of securing means of the base unit according to an embodiment of the present invention.

DETAILED DESCRIPTION OF PREFERRED EMBODIMENTS

Figure 1A:
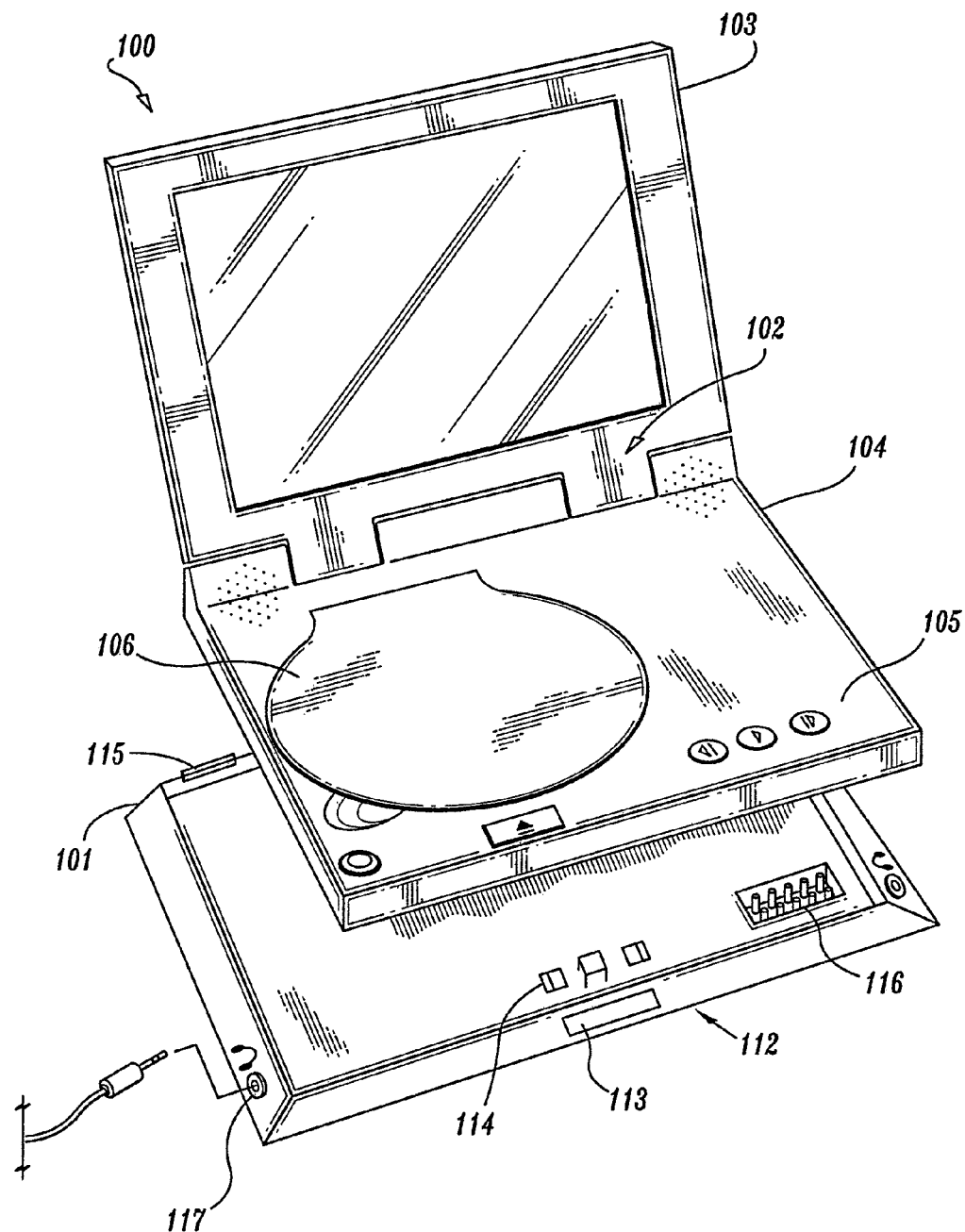
FIG. 1A is an illustration of a clamshell-type video system according to an embodiment of the present invention.

Referring now to FIG. 1A, a portable video system according to an embodiment of the present invention comprises a video unit 100 and a base unit 101. The video unit 100 comprises a hinge 102, and a pivotable display 103 pivotally attached to a video player 104 on the hinge 102. The display 103 can be pivoted away from the video player 104 and adjusted to a desired viewing angle by a user. The display 103 can be folded down flat against the video player 104. When folded, the display 103 lies along a plane parallel to the plane of the video player 104.

The hinge 102 allows the display 103 to be positioned at various angles for facilitating viewing of the display when the video player 104 is set in different positions. For example, if the video player 104 is in an upright position (with the control panel being horizontal relative to the ground and facing up), the display 103 is preferably positioned at about a 90-degree angle from the control panel. In another example, if the video player 104 is in a horizontal position (with the control panel in a vertical position relative to the ground), the display is preferably adjusted to about a 180-degree angle from the video player 104.

The pivotable display 103 comprises an LCD type monitor or flat-panel display. The video player 104 comprises an apparatus for receiving a video medium, such as a videocassette or a DVD. The apparatus can be, for example, a clamshell-type door 106 for receiving a videocassette and covering a DVD read head and spindle (not shown). The control panel 105 comprises a plurality of control buttons for controlling the functions of the video player, for example, volume control, fast forward, rewind, pause, eject and play, and a power on/off button.

Figure 1B:
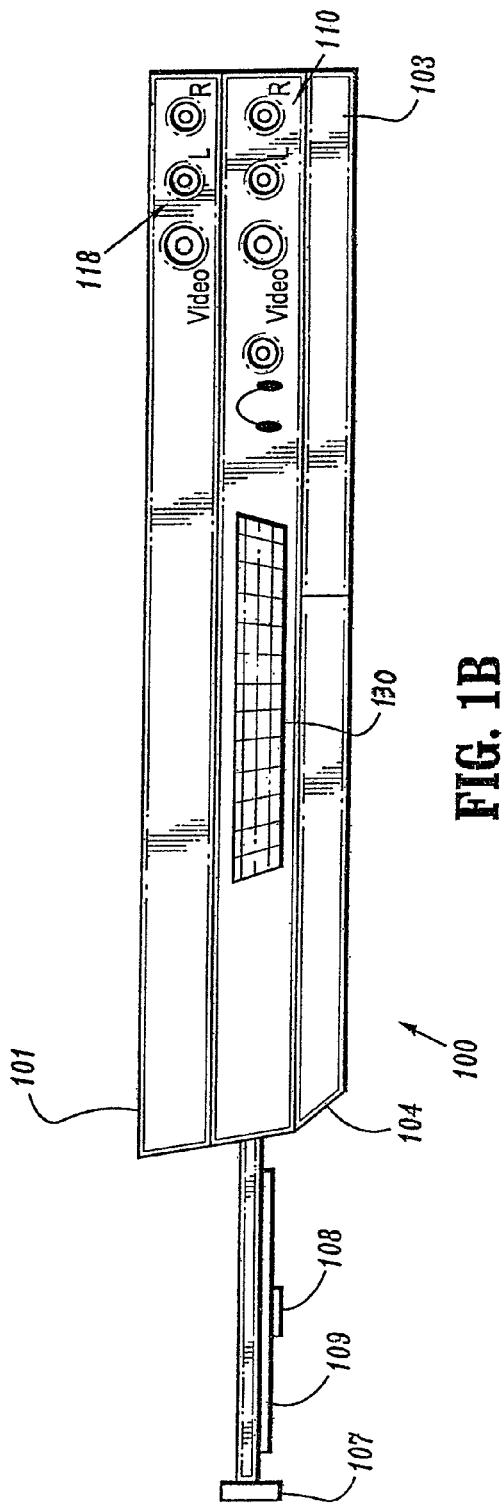
FIG. 1B is an illustration of a drawer-type video system according to an embodiment of the present invention.
Figure 1D:
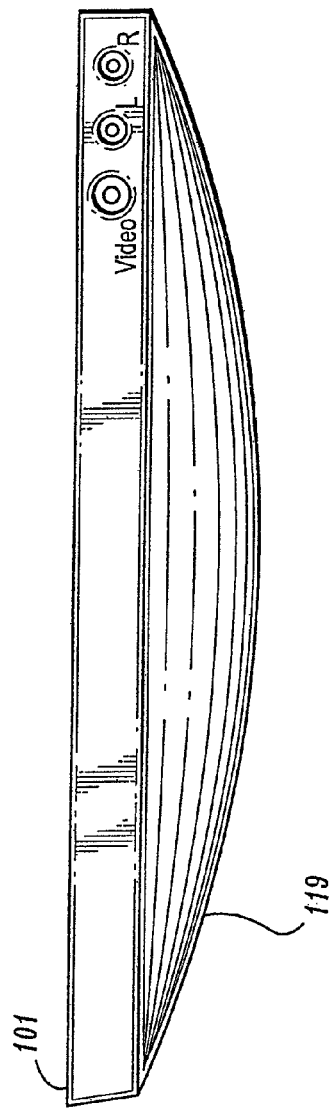
FIG. 1D is an illustration of a base unit and a cover according to an embodiment of the present invention.
Figure 1C:
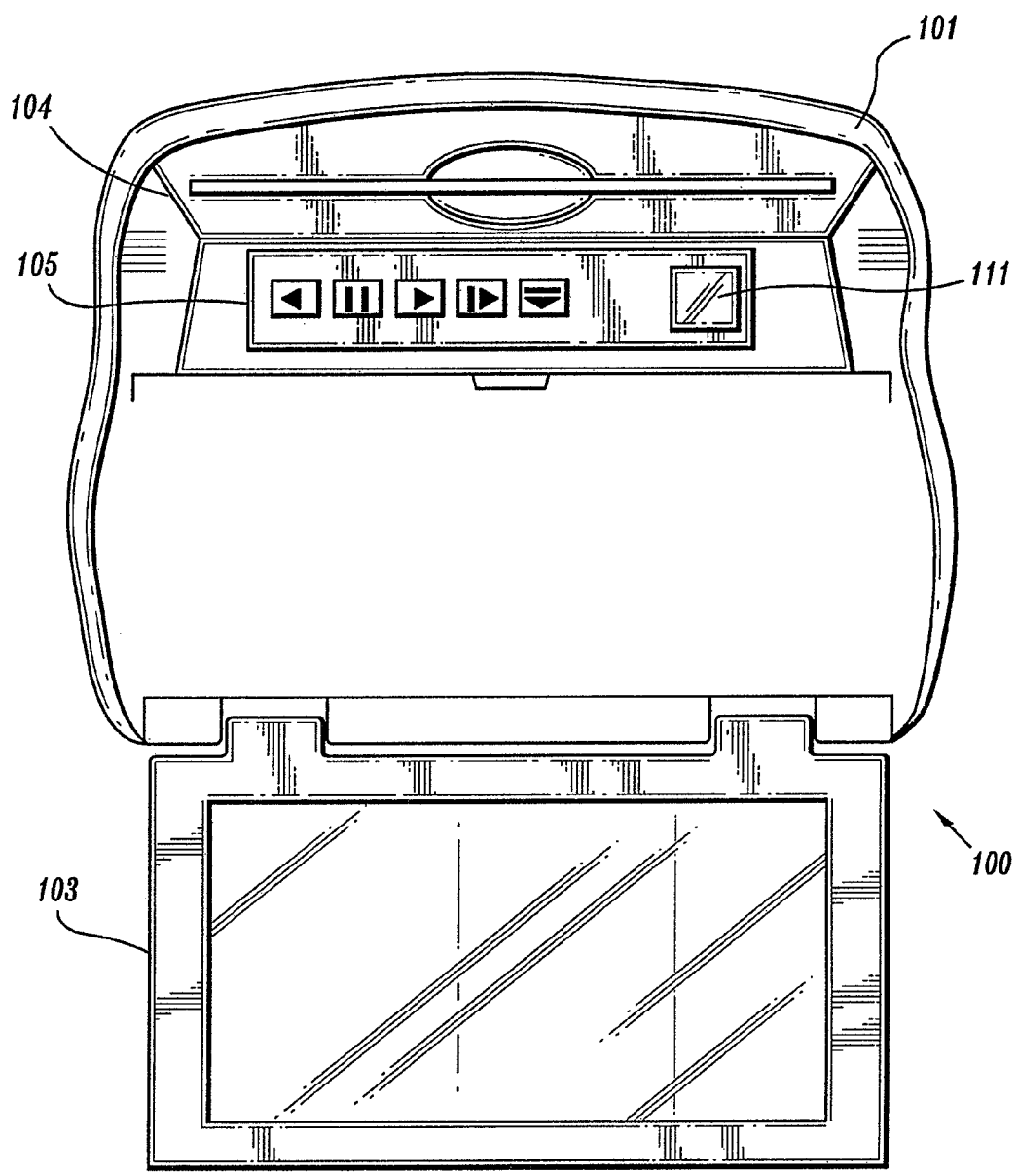
FIG. 1C is an illustration of a slot-type video system according to an embodiment of the present invention.

While the video unit 100 has been described in terms of a clamshell-type device, the video unit 100 can be embodied in other configurations, for example, as a drawer-type device comprising a drawer 107 and a spindle 108 for securing a disk 109 in place as shown in FIG. 1B. While the video unit 100 is shown receiving the disk 109 on an underside of the drawer 107, it is to be understood that the video unit 100 can also be configured to receive the disk 109 on a topside of the drawer 107 depending on a desired application. The video unit 100 can also be embodied as, for example, a slot-type device, as shown in FIG. 1C.

The video player 104 can include audio/video input and/or output jacks 110 for optional connections with external audio/video sources such as video game players, camcorders, computers, television or additional video screens, headphones, and the like. The video player 104 and/or the control panel 105 can include an infrared (IR) port 111 for connecting to wireless devices such as wireless headphones. In addition, it is to be appreciated that the IR port 111 can receive control signals from a remote control device. The video player 104 can also include vehicle convenience features, for example, a dome light 130.

The video unit can be coupled to a base unit 101. The base unit can be securely fastened to a substrate such as a vehicle's ceiling, under a hanging cabinet in a kitchen, or on a tabletop. The base unit 101 comprises a quick release mechanism 112 for securing and releasing the video player 104. The quick release mechanism 112 can include a button 113 for releasing a catch 114, which is secured to the video player 104 by pressing the video player 104 securely into the base unit 101. A rear portion of the video player 104 can be secured by a projection 115 that fits within a hollow in the rear portion of the video player 104. The pivotable display 103 can be adjusted at various angles despite the video player 104 being secured in the base unit 101.

The base unit can optionally comprise a pin array 116 that connects to a corresponding pin array of the video player 104 for providing, for example, power to the video unit 100, a television antenna connection, and audio/video input/output connections. When the video player 104 is secured to the base unit 101, the pin array of the base unit 101 physically connects to the pin array of the video player 104. Thus, the base unit 101 can comprise, for example, headphone jacks 117 for playing an audio track from the video unit 100. The base unit 101 can also comprise, for example, a connection to auxiliary speakers or video screens 118.

When the video unit 100 is removed from the base unit 101, a cover 119 can conceal a portion of the base unit 101. The cover 119 is manufactured from a material such as, plastic, wood, and/or aluminum. The cover 119 can comprise a dome light for illuminating the interior of the vehicle.

Figure 1G:
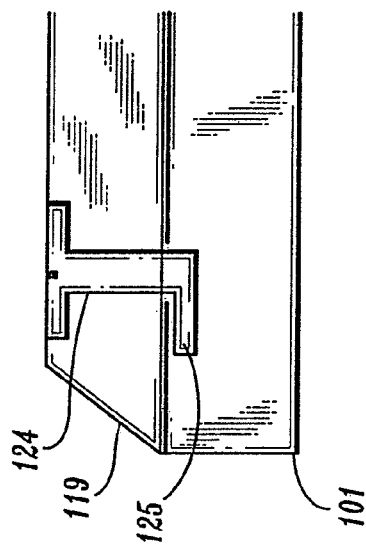
FIG. 1G is an illustration of a video system comprising a screw according to an embodiment of the present invention.
Figure 1F:
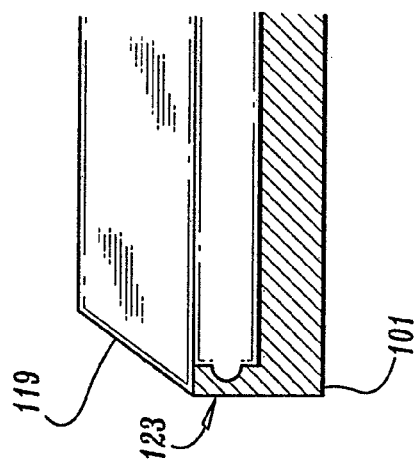
FIG. 1F is an illustration of a video system comprising a pressure fitting according to an embodiment of the present invention.
Figure 1E:
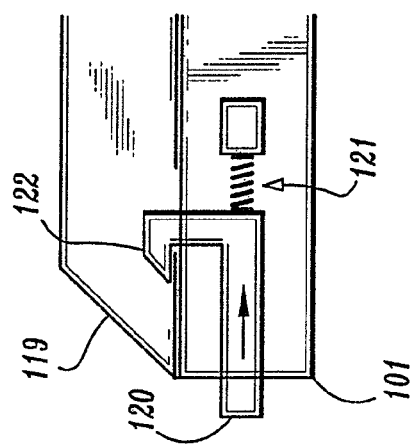
FIG. 1E is an illustration of a video system comprising a latch mechanism according to an embodiment of the present invention.

The cover 119 and video player 104 can be secured by the same mechanisms. Thus, the cover 119 and the video player 104 can have one or more features in common, such as openings for receiving latches and the like. Referring to FIG. 1E, the cover 119 is secured by a latch mechanism comprising a latch 120 that passes into a bottom portion of the cover 119. The latch 120 is momentarily displaced as the cover 119 is coupled with the base unit 101. A spring 121 secures the latch 120 in the bottom portion of the cover 119. The latch 120 can be pressed, aligning a hook portion 122 of the latch with an opening in the bottom portion of the cover 119 or video player 104, and the cover 119 or video player 104 can be pulled away from the base unit 101. Referring to FIG. 1F, the cover 119 or video player 104 can be secured by a pressure fitting 123, wherein the base includes a channel into which a rib of the cover fits securely, or in the alternative, the cover includes a channel into which a rib of the base fits securely. Referring to FIG. 1G, another example of a mechanism for securing the cover 119 or video player 104 is a screw 124 secured to the cover 119 comprising a lobe 125 that passes into the base unit 101 at a certain position, wherein the lobe aligns with an opening in the base unit 101. The screw 124 can be turned to misalign the lobe with the opening, securing the cover 119 to the base unit 101. Further still, the cover 119 can be secured by other mechanisms, including, for example, locks, clips, and the like. A combination of securing mechanisms can be used.

Figure 2:
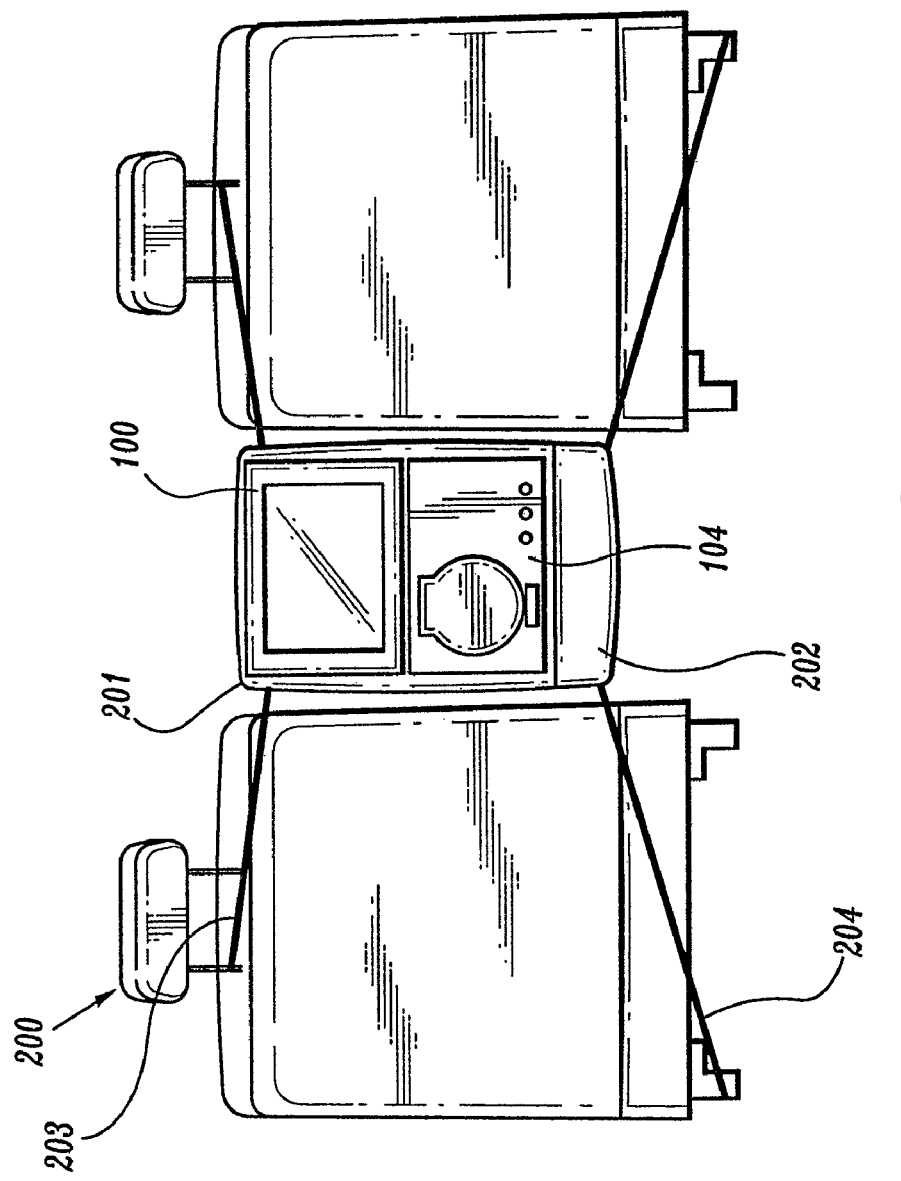
FIG. 2 is an illustration of an installed portable video system according to an embodiment of the present invention.

FIG. 2 depicts an example of a set up of a portable video unit 100 according to an embodiment of the present invention. A bag 201, comprising an integrated base unit, secures the video player 104 of the video unit 100. The bag 201 can be suspended from objects affixed inside a vehicle, for example, between a pair of seats 200, for viewing by rear seat passenger viewers. For illustrative purposes, FIG. 2 shows the video unit 100 suspended between front seats 200 of a vehicle in a substantially upright position by a bag 201, which includes a compartment for containing the video unit 100. In this position, a panel 202 of the bag and the video player 104 of the video player 100 face a rear seat. The bag 201 can be suspended behind a second row of seats in vehicles equipped with three rows of seating.

While FIG. 2 depicts a clamshell-type video unit 100, it is to be understood that other types of video units can be implemented with the bag 201. For example, the video unit 100 can be a slot-type unit or a drawer-type unit.

Figure 3A:
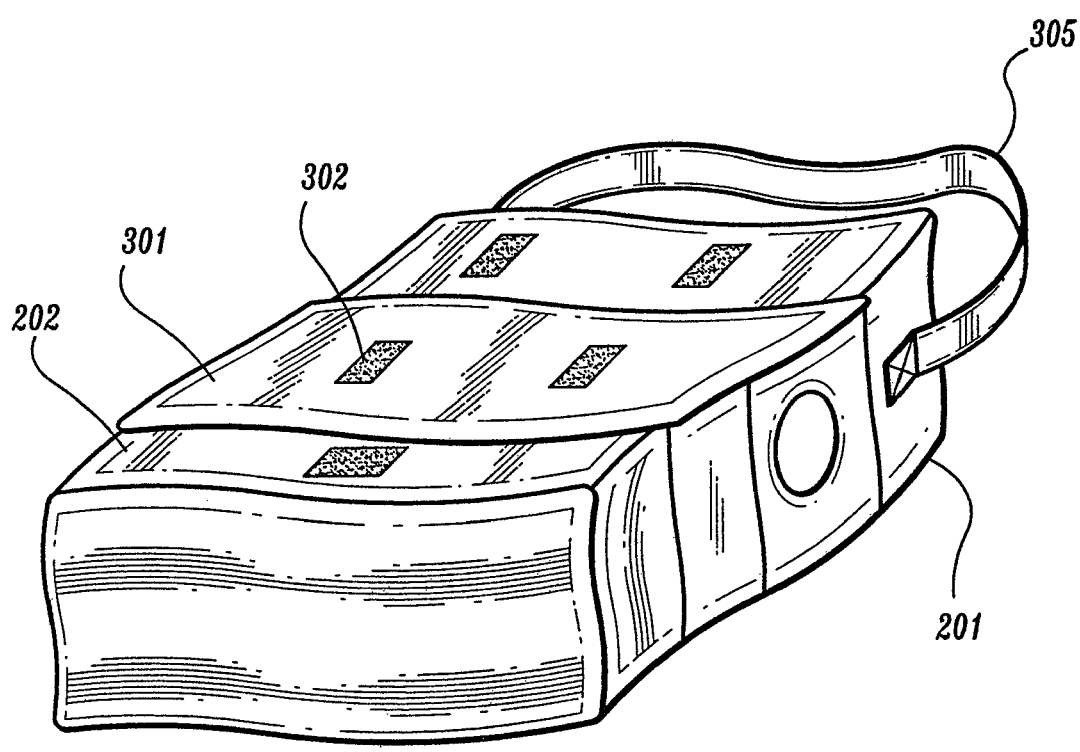
FIG. 3A is an illustration of a portable video system according to an embodiment of the present invention.
Figure 3B:
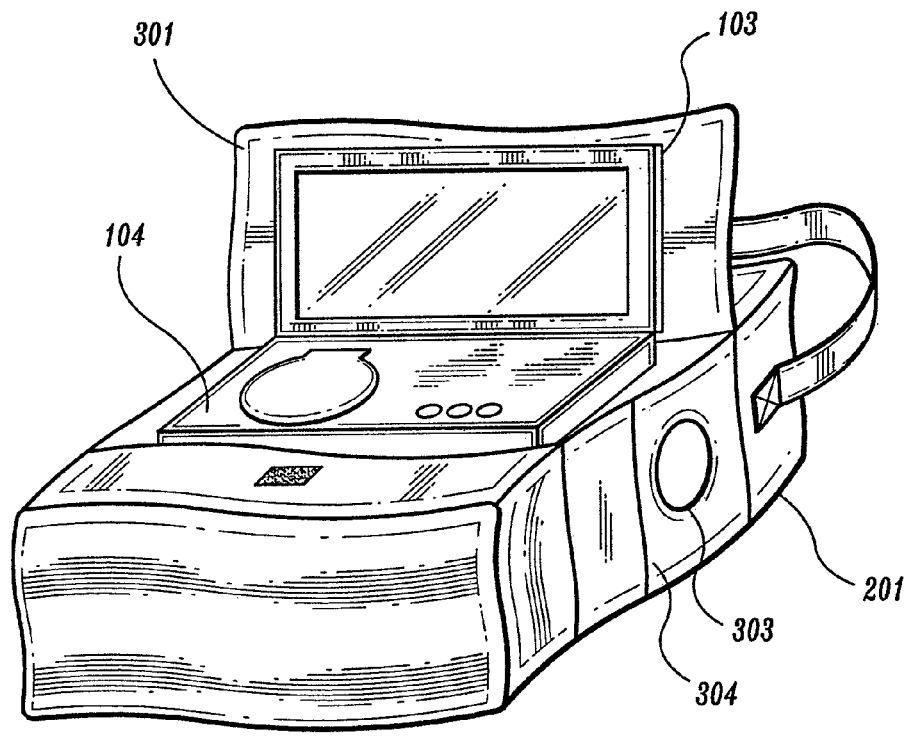
FIG. 3B is an illustration of a portable video system according to an embodiment of the present invention.

Referring to FIG. 3A, the bag 201 includes a flap cover 301, which is, partially removable and can be opened or closed by a user. The flap cover 301 is preferably held closed by VELCRO® type material fastener 302 disposed at an upper portion of panel 202 of the bag. The flap cover 301 is peeled open from the VELCRO fastener, and when opened, permits access to the video player 105 and exposes the display 103. With the bag suspended in the position as shown in the illustrative embodiment of FIG. 2, the display 103 is pivoted to around 180 degrees from the control panel for viewing. When the display 103 is closed, the flap cover 301 can be closed against the VELCRO material fastener 302 and the video player 105 and the display 103 cannot be accessed.

The bag also includes a ventilation panel 303 for further facilitating air circulation through a side panel 304 of the bag 201.

The bag 201 preferably includes adjustable upper fastening means 203 to secure and suspend the video bag from, for example, each headrest of front seats 200, and adjustable lower fastening means 204 to secure and suspend the video bag from, for example, each leg of front seats 200, thus positioning the video unit 100 securely between the front seats 200 for viewing. The adjustable upper and lower fastening means, 203 and 204, include straps, VELCRO fasteners, buckles, snaps, buttons, or hooks. The bag 201 also includes a carrying strap 305 for carrying the video unit during transport, as shown in FIG. 3A.

Figure 4:
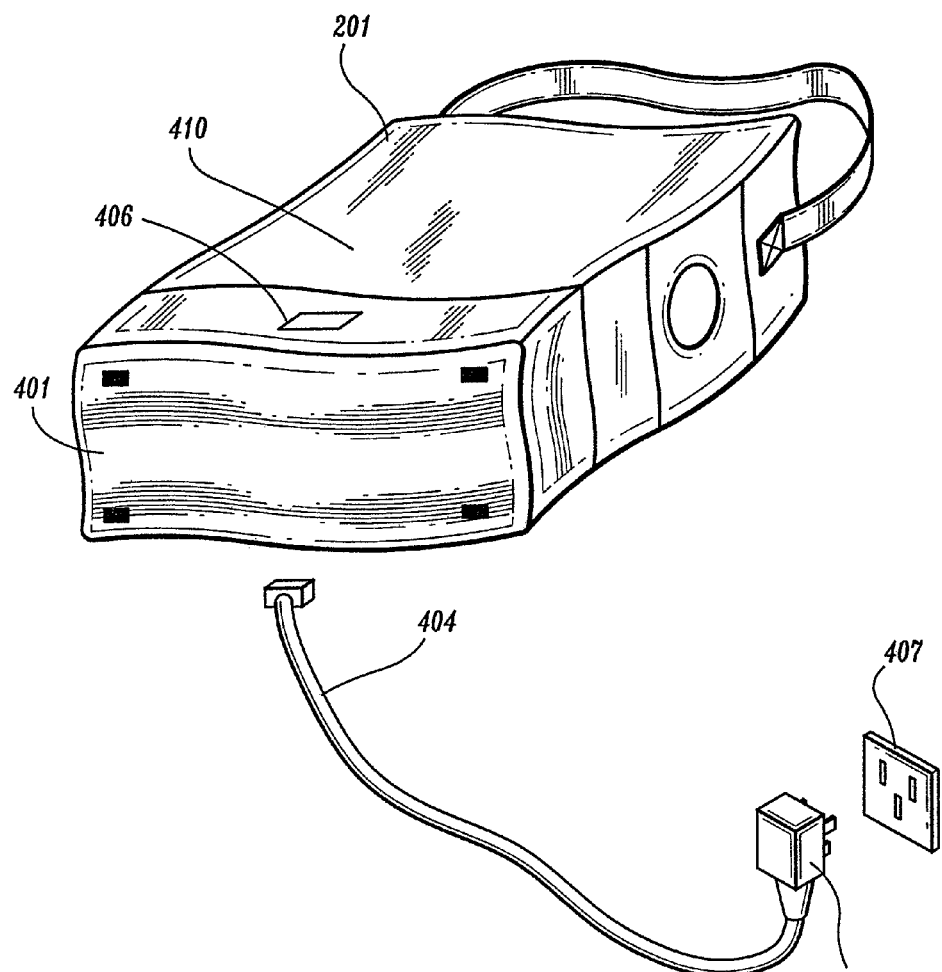
FIG. 4 depicts an exemplary power supply connection of a portable video system to a wall outlet according to an embodiment of the present invention.

FIG. 4 illustrates an exemplary auxiliary power connection of a portable video system to a wall outlet. A top face 410 of the bag 201 includes an opening 406 to facilitate insertion of an electrical cord 404 into the video player. The electrical cord may include, for example, an AC-DC adapter 405 for connection to a wall outlet 407. Power can be supplied to the video unit 100 from the auxiliary power connection through the integrated base unit. Further, the bag 201 comprises a battery for portable power supply to the video unit 100. Power can be selectably supplied to the video unit from the auxiliary power connection or the battery.

Figure 5:
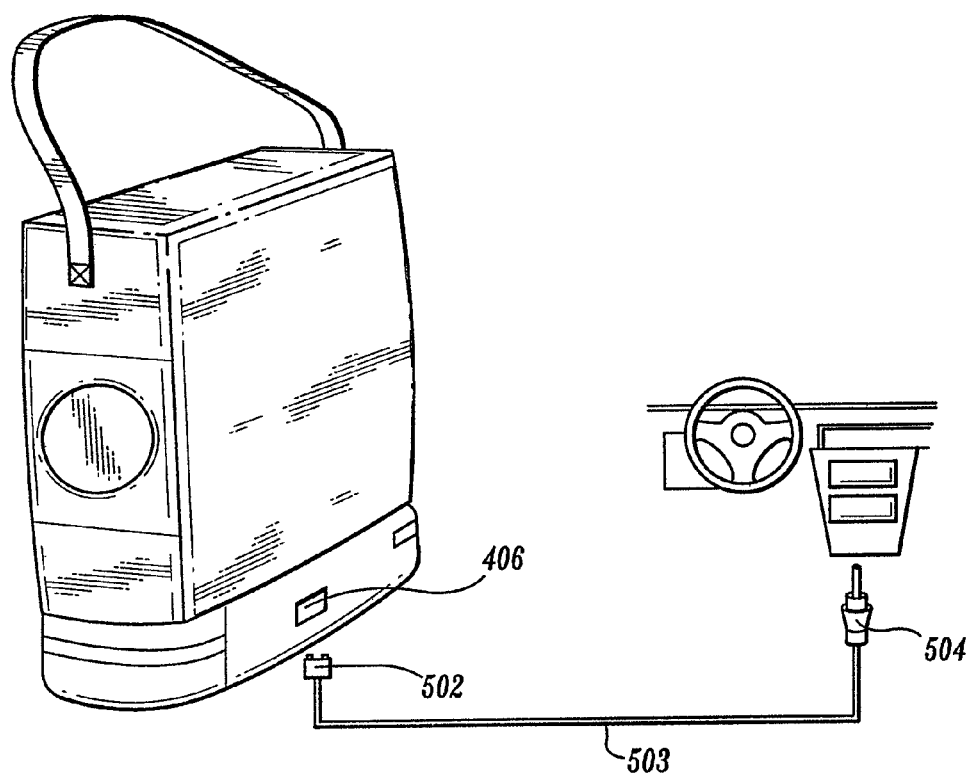
FIG. 5 depicts an exemplary power supply connection of a portable video system inside a vehicle according to an embodiment of the present invention.

FIG. 5 illustrates an exemplary auxiliary power connection of a portable video system to a cigarette lighter of a vehicle in an aspect of the present invention. The opening 406 can facilitate connection, for example, to a DC 12V jack 502 of a cord 503. A DC 12V adaptor 504 coupled to cord 503 connects with a cigarette lighter receptacle of a vehicle for supplying power to the video unit.

It is to be appreciated that a portable video system according to the present invention is easily removable from and can be operated outside of a vehicle, for example, in home or office environments. In addition, the bag for containing the video unit can be attached to and thus suspend the video unit from various other objects, such as chairs, walls, doors, etc. It is also to be appreciated that the video unit can be operated when removed from the bag 201.

Referring to FIG. 6A, the base unit 101 includes a bottom portion 601. The base unit 101 can be connected to the vehicle's electrically system. A power receptacle 602 in the bottom portion 601 can accept a power source 603, such as an AC or DC power supply. The power receptacle 602 is a pin array and can include additional connections for audio/video signals to external devices, for example, a vehicle's stereo system. The bottom portion 601 also comprises a means for securing the base unit 101 to a substrate. The securing means can include, for example, a clip as shown in FIG. 6B, a screw as shown in FIG. 6C, double sided tape, or the like. A combination of various securing means can also be implemented.

Figure 7A:
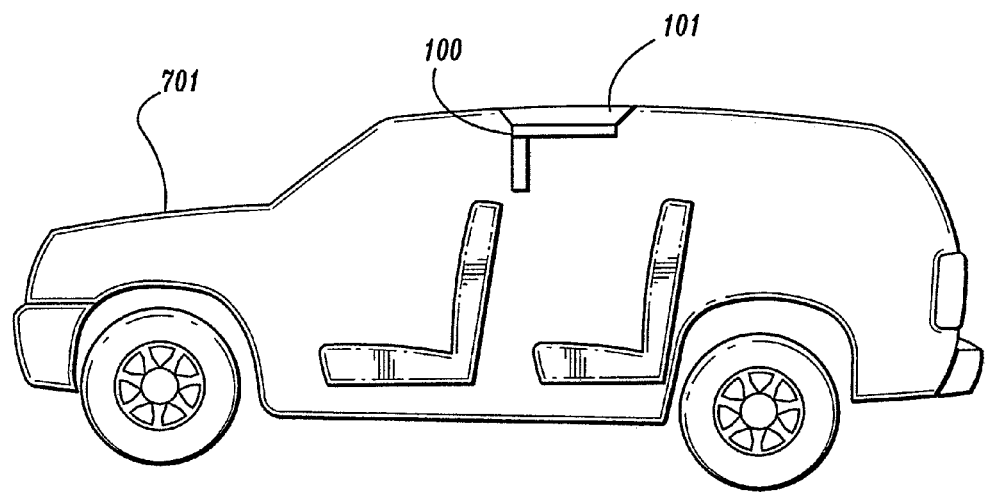
FIGS. 7A-7C are illustrations of installed base units according to an embodiment of the present invention.
Figure 7B:
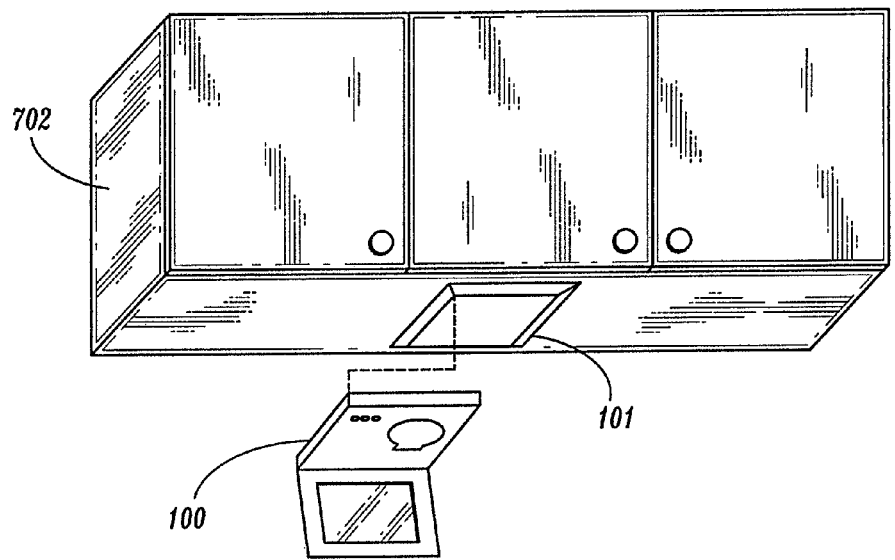
Figure 7C:
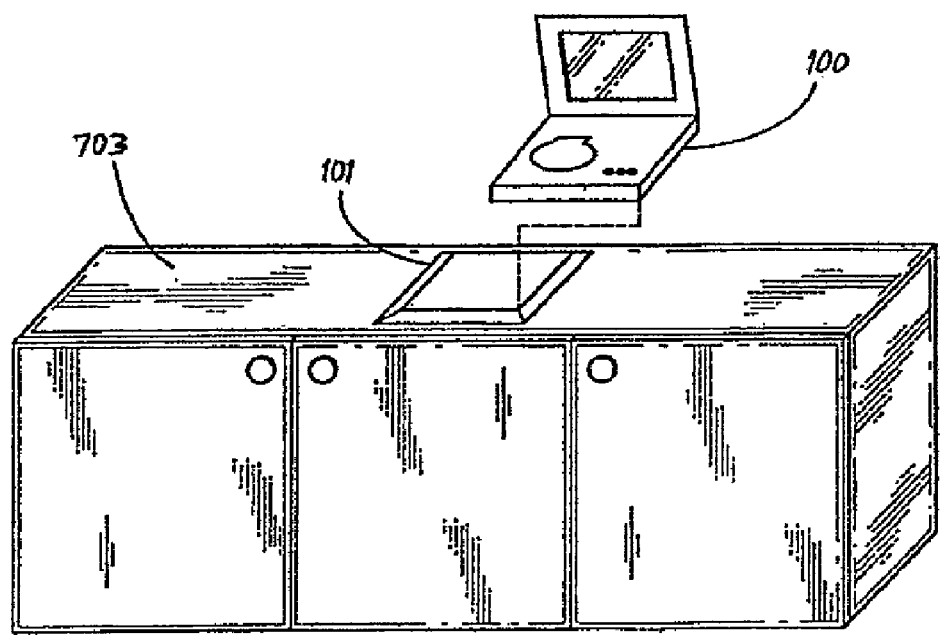

Referring to FIGS. 7A-7C, the base unit 101 can be affixed to various substrates. For example, the base unit 101 can be affixed to a ceiling of a vehicle 701, for securing the video unit 100. The base unit 101 can be affixed to the underside of a cabinet 702 as shown in FIG. 7B for securing the video unit 100. The base unit 101 can be secured to various other substrates, such as a tabletop 703 as shown in FIG. 7C, or a wall.

Having described embodiments for a portable video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A portable video system comprising: a video unit for facilitating play of a video medium; a display pivotally attached to the video unit; and a base unit secured to a substrate for selectively coupling a control panel of the video unit to the substrate, wherein the control panel can be selectively un-coupled from the base unit, and the substrate is a bag for housing the video player and the display, the bag having four adjustable straps for suspending the bag, each strap respectively projecting at an angle with respect to each corner of the bag, wherein each strap is secured to the bag only at or adjacent to a single corner of the bag, and wherein the control panel of the video unit is coupled to the base unit using a pressure fitting mechanism, wherein the pressure fitting mechanism comprises a channel formed in the base unit, and a rib formed on the control panel, wherein the rib fits into the channel to form the pressure fit.

2. The system of claim 1, further comprising:
a ventilation panel disposed on a side panel of the bag,
wherein the ventilation panel facilitates air circulation throughout the bag.

3. The system of claim 1, further comprising:
a flap cover disposed on the bag,
wherein the flap cover covers the display while in a closed position and exposes the display while in an opened position.

4. The system of claim 3, further comprising:
a first fastener disposed on an upper surface of the flap cover; and
a second fastener disposed on an upper portion of a panel on the bag,
wherein the first and second fasteners engage each other when the flap cover is in the opened position.

5. A portable video system comprising: a video unit for facilitating play of a video medium; a display pivotally attached to the video unit; and a base unit secured to a substrate for selectively coupling a control panel of the video unit to the substrate, wherein the control panel can be selectively un-coupled from the base unit, and the substrate is a bag for housing the video player and the display, the bag having four adjustable straps for suspending the bag, each strap respectively projecting at an angle with respect to each corner of the bag, wherein the first strap extends from a single vertical post of a headrest of a first seat to a first corner of the bag, the second strap extends from a single vertical post of a headrest of a second seat to a second corner of the bag, the third strap extends from a bottom portion of the first seat to a third corner of the bag, and the fourth strap extends from a bottom portion of the second seat to a fourth corner of the bag, and wherein the control panel of the video unit is coupled to the base unit using a pressure fitting mechanism, wherein the pressure fitting mechanism comprises a channel formed in the base unit, and a rib formed on the control panel, wherein the rib fits into the channel to form the pressure fit.

6. The system of claim 5, further comprising:
a ventilation panel disposed on a side panel of the bag,
wherein the ventilation panel facilitates air circulation throughout the bag.

7. The system of claim 5, further comprising:
a flap cover disposed on the bag, wherein the flap cover covers the display while in a closed position and exposes the display while in an opened position.

8. The system of claim 7, further comprising:
a first fastener disposed on an upper surface of the flap cover; and
a second fastener disposed on an upper portion of a panel on the bag,
wherein the first and second fasteners engage each other when the flap cover is in the opened position.

* * * * *